(12) United States Patent
O'Connor et al.

(10) Patent No.: US 9,883,032 B2
(45) Date of Patent: Jan. 30, 2018

(54) SYSTEM AND METHOD FOR GUIDING AGENTS IN AN ENTERPRISE

(71) Applicant: Avaya Inc., Santa Clara, CA (US)

(72) Inventors: Neil O'Connor, Galway (IE); Tony McCormack, Galway (IE); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 416 days.

(21) Appl. No.: 14/450,644

(22) Filed: Aug. 4, 2014

(65) Prior Publication Data
US 2016/0036975 A1 Feb. 4, 2016

(51) Int. Cl.
*H04M 3/51* (2006.01)

(52) U.S. Cl.
CPC ........ *H04M 3/5141* (2013.01); *H04M 3/5191* (2013.01)

(58) Field of Classification Search
CPC .................... H04M 3/5141; H04M 3/5191
USPC .................................................. 379/265.09
See application file for complete search history.

(56) References Cited

U.S. PATENT DOCUMENTS

| | | | |
|---|---|---|---|
| 7,739,115 B1 * | 6/2010 | Pettay .............. | G10L 15/26 379/265.06 |
| 8,472,590 B1 * | 6/2013 | Curtis ............. | H04M 7/0027 379/202.01 |
| 8,989,369 B1 * | 3/2015 | Asghari ............. | H04M 3/5191 379/265.01 |
| 2005/0193055 A1 * | 9/2005 | Angel ................. | G06Q 30/02 709/202 |
| 2007/0005776 A1 * | 1/2007 | Hansen .............. | G06Q 30/02 709/227 |
| 2009/0171668 A1 | 7/2009 | Sneyders et al. | |
| 2015/0121250 A1 * | 4/2015 | Waxman ........... | G06F 3/04817 715/753 |
| 2015/0350428 A1 * | 12/2015 | Glass ................. | H04M 3/493 379/88.01 |
| 2015/0350435 A1 * | 12/2015 | Connolly .......... | G06Q 30/0631 379/265.03 |
| 2016/0140635 A1 * | 5/2016 | Devageorge ..... | G06Q 30/0613 705/26.41 |

\* cited by examiner

*Primary Examiner* — Harry S Hong

(57) ABSTRACT

A contact manager system for generating an agent's script is disclosed. The contact manager system includes a monitoring module configured to determine one or more browsing activities and related context information of at least one customer. The contact manager system further includes a script generation module configured to generate the at least one agent script based on the one or more determined browsing activities. The contact manager system further includes a display module configured to display the at least one agent script to one or more agents. The contact manager system further includes a verification module configured to validate the agent's script.

20 Claims, 7 Drawing Sheets

SYSTEM AND METHOD FOR GUIDING AGENTS IN AN ENTERPRISE

BACKGROUND

Field

Embodiments of the present invention generally relate to a system and method to provide assistance to agents of an enterprise and particularly to a system and method for guiding agents of the enterprise to handle incoming contacts.

Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may handle contacts of a certain nature more effectively and/or efficiently as compared to an agent of lesser skill level. There are other contact center agents who may not be as proficient as the primary skill level agent, and those agents are identified either as skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of contacts/contact requests or work requests that may be processed in a given amount of time. Agent utilization is a measure of how efficiently the agents' time is being used. Customer service level is a measure of the time customers spend waiting for their work to be handled. Company contact center customers wish to provide service to as many requests as possible in a given amount of time, using the least number of agents to do so, and minimizing the wait time for their customers that may increase the Service Level Agreement (SLA) of the contact center. Further, the contact center may also have to maintain the Customer Satisfaction (CSAT) metrics in order to maintain the KPIs of the contact center. For this purpose, agents may have to maintain the quality of services provided to the customers through multimedia (e.g., voice contacts, video contacts, emails, etc.).

Generally, in a contact center, when a customer makes a call, for example, through an Interactive Voice Response (IVR) Unit, the call is routed to an agent based on the customer's input. The agent is selected based on some parameters, for example, an agent's skill, a type of call, a customer's preferred language, etc. Further, the agent is then provided with customer information received from the customer's input and a predefined script. The agent may have to strictly follow the script in order to provide services to the customer and also to maintain the service level agreement of the contact center.

However, the information provided to the customer is, sometimes, incomplete and conventional techniques do not provide provisions to tailor or modify these predefined agent's scripts. Further, custom tailoring of these predefined agent scripts is limited to static mappings of skills of agents, a Variable Directing Number (VDN), a Dialed Number Identification Service (DNIS), etc. to desired statically defined phrases. The VDN is a route point inside the contact center, which receives incoming work requests. For example, incoming work requests related to the sale of health insurance policies may route to a route point A and incoming work requests related to complaints of car insurance may route to another routing point B. The DNIS is a number that a customer or a potential customer dials to reach an agent of the contact center and based on the number the agent knows some information associated with the customer.

Further, the agents of the contact center may optimize the predefined scripts to provide services to gold rated customers, i.e., customers having higher revenue products/services of the contact center. However, it is a complex and cumbersome process to optimize the predefined agent's scripts. Further, conventional systems do not provide techniques to validate content of scripts provided to the agents. For example, there is no way to verify whether content of a script provided to an agent is utilized by the agent or not during a communication session with a customer.

There is thus a need for a system and method for guiding agents of an enterprise to improve dynamically handling of incoming contacts.

SUMMARY

Embodiments in accordance with the present invention provide a contact manager computer system for dynamically generating at least one agent script. The call manager system includes a monitoring module for determining one or more browsing activities of at least one customer and obtaining customer context information of the at least one customer from the one or more determined browsing activities. The system further includes a script generation module for generating the at least one agent script based on the obtained customer context information from the one or more determined browsing activities of the at least one customer. The system further includes a display module for displaying the at least one agent script to one or more agents Embodiments in accordance with the present invention further provide a computer-implemented method for dynamically generating at least one agent script. The method includes determining one or more browsing activities of at least one customer to obtain customer context information of the at least one customer; generating the at least one agent script based on the obtained customer context information from the one or more determined browsing activities; and displaying the at least one agent script to one or more agents.

Embodiments in accordance with the present invention further provide a computer-implemented method for guiding at least one agent during a communication session. The method includes determining one or more browsing activities of at least one customer and obtaining customer context information of the at least one customer from the one or more determined browser activities; selecting at least one browsing activity from the one or more determined browsing activities of the at least one customer; generating at least one agent script based on the customer context information of the at least one selected browsing activity; displaying the at least one agent script to one or more agents; and validating the at least one agent script.

Embodiments of the present invention may provide a number of advantages depending on its particular configuration. First, embodiments of the present application provide a system and a method for guiding agents of an enterprise to improve handling of incoming contacts. Embodiments of the present application provide an agent's script to guide agents during a communication session with a customer. Next, embodiments of the present application dynamically generate an agent's script based on customer context information from browsing activities of a customer. The browsing activities of the customer are monitored and relevant words and/or phrases from the customer context information are selected. Further, based on these words and/or phrases the agent's script is generated for the future contact/customer session. Also, a predefined script may be tailored by using the monitored context information of the browsing activities of the customer. The agent script is then stored in a database of the enterprise.

Further, embodiments of the present application dynamically generate the agent's script before the customer initiates a communication session with an agent of the enterprise. The tailored script is displayed to the agent when the customer initiates the communication session with the agent. Next, the system validates the generated agent's script. The agent's script may be validated by co-relating the agent's speech with the generated agent's script.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
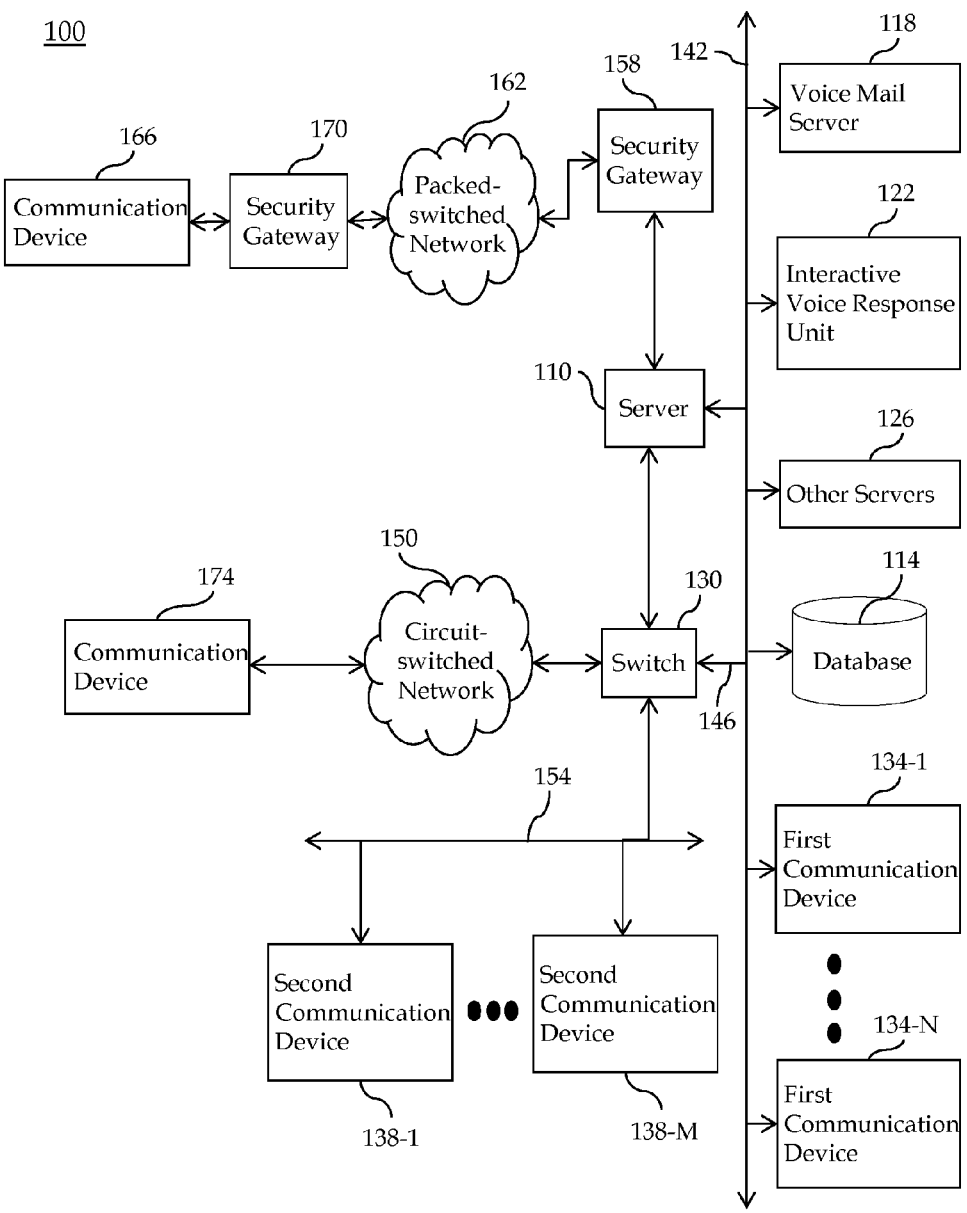
FIG. 1A illustrates a block diagram depicting a contact center, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114 containing contact or customer related information, resource or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
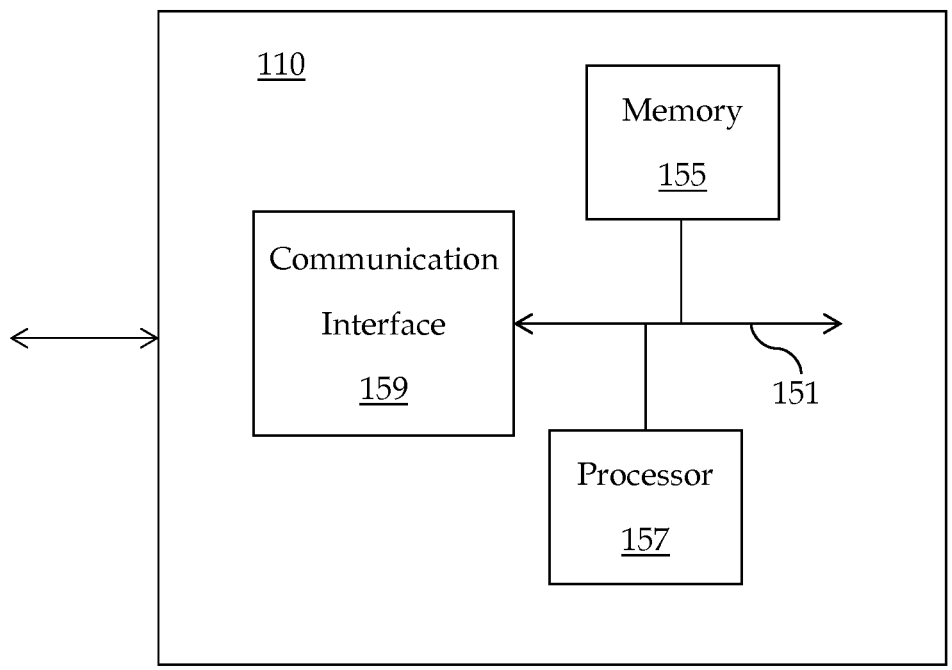
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
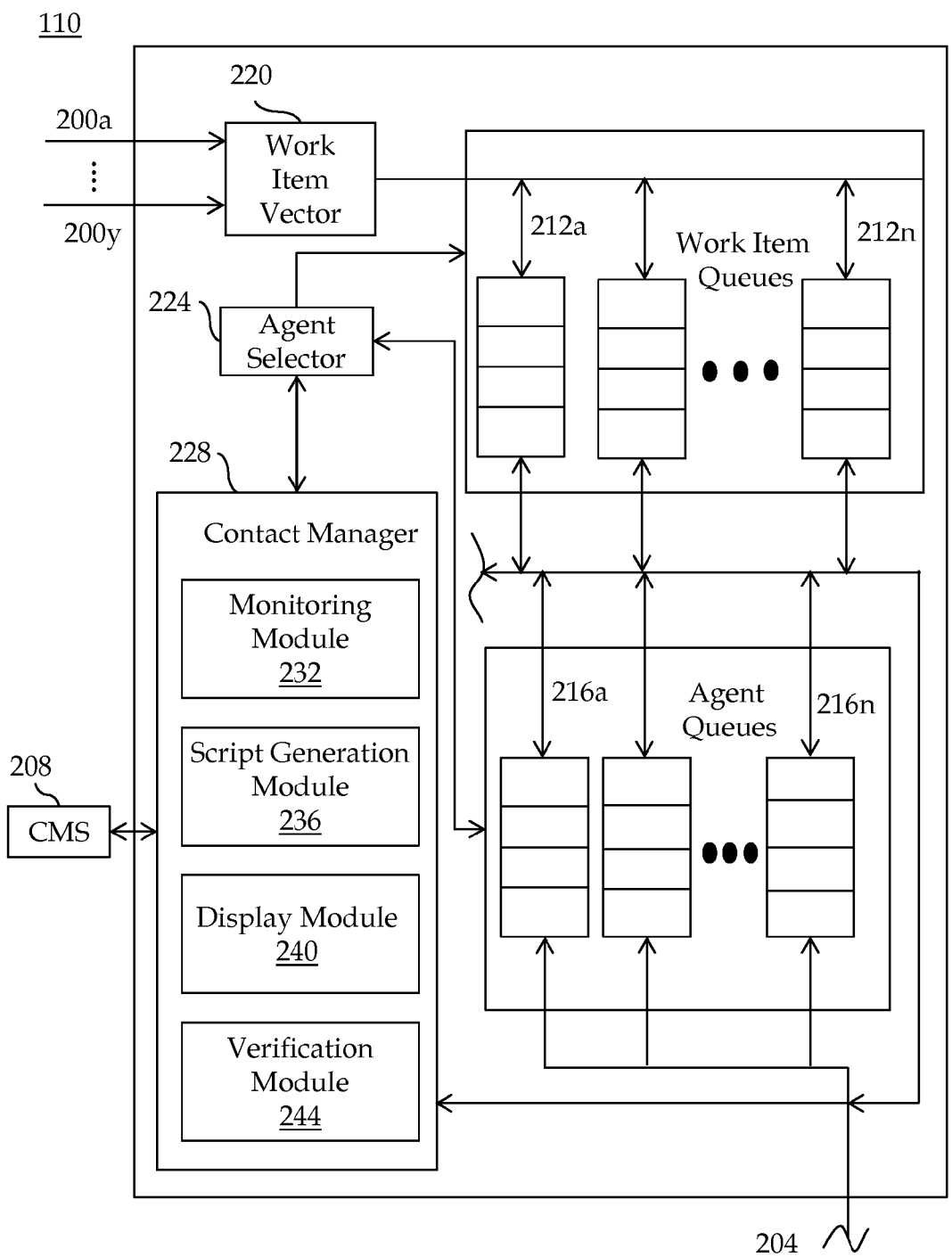
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212a-n and a separate set of agent queues 216a-n. Each contact queue 212a-n corresponds to a different set of agent queues, as does each agent queue 216a-n. Conventionally, contacts are either prioritized or are queued in individual ones of the contact queues 212a-n in their order of priority or are queued in different ones of a plurality of contact queues that correspond to a different priority. Likewise, each agent's queues are prioritized according to his or her level of expertise or skill in that queue, and agents are queued in either individual ones of agent queues 216a-n in their order of expertise level or in different ones of a plurality of agent queues 216a-n that correspond to a queue and each one of which corresponds to a different expertise level. In an embodiment of the present invention, the agent queue 216a-n may include a set of reserve agents queue in the contact center 100.

According to an embodiment of the present invention, included among the control programs in the server 110 is a work item vector 220. Contacts or calls incoming to the contact center 100 are assigned by the work item vector 220 to different work item queues 212a-n based upon a number of predetermined criteria, including a customer's identity, customer needs, contact center needs, current contact center queue lengths, a customer value, and an agent skill that is required for proper handling of the contact. Agents who are available for handling work items are assigned to the agent queues 216a-n based upon the skills that they possess. An agent may have multiple skills, and hence may be assigned to multiple agent queues 216a-n simultaneously. Furthermore, an agent may have different levels of skill expertise (e.g., skill levels 1-N in one configuration or merely primary skill levels and secondary skill levels in another configuration), and hence may be assigned to different agent queues 216a-n at different expertise levels.

In one configuration, the contact center 100 is operated by a contract operator (e.g., a supervisor or a manager of the contact center 100), and each of the work item queues 212a-n, and possibly each of the agent queues 216a-n, corresponds to a different client. Each client may have a separate Service Level Agreement (SLA) or other type of performance measurement agreement with the contract operator regarding performance expectations, goals, requirements or specifications for the client's respective queue(s).

Further, embodiments in accordance with the present invention may include, among the programs executing on the server 110, an agent selector 224 and a contact manager computer system 228. The agent selector 224 and the contact manager computer system 228 are stored either in the main memory or in a peripheral memory (e.g., disk, CD ROM, etc.) or some other computer-readable medium of the contact center 100. Further, the agent selector 224 monitors the occupants of the work item and agent queues 212a-n and 216a-n, respectively, and contact center objectives, rules, and policies and assigns agents to service work items.

The agent selector 224 distributes and connects these work items to communication devices of available agents based on the predetermined criteria noted above. When the agent selector 224 forwards a contact (or first work item) to an agent, the agent selector 224 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 224.

In an embodiment of the present invention, the agent and their associated data are maintained and updated in the database 114 of the contact center 100. Upon the completion of handling a work item, a generator (not shown) collects selected metrics for the work item. These metrics may include skills involved in servicing the work item, an identifier of a servicing agent, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

In an exemplary embodiment of the present invention, the contact manager computer system 228 is configured to determine browsing activities of a customer and related customer context information. In an embodiment of the present invention, the customer may perform the browsing activities on a Web RTC enabled browser. Further, the contact manager computer system 228 is configured to generate an agent's script based on the customer context information of the determined browsing activities. Further, the contact manager computer system 228 is configured to display the agent's script to an agent of the contact center. Also, the contact manager computer system 228 is configured to validate the agent's script during an ongoing session between the customer and the agent.

According to an embodiment of the present invention, the contact manager computer system 228 includes certain modules, such as, but is not restricted to, a monitoring module 232, a script generation module 236, a display module 240, and a verification module 244. In some embodiments, one or more of the monitoring module 232, the script generation module 236, the display module 240 and the verification module 244 may be implemented by one or more software processes running on the server 110. The server 110 may implement one or more software processes by use of the processor 157 being suitably programmed by use of software instructions stored in the memory 155 coupled to the processor 157.

The monitoring module 232 may monitor browsing activities of a customer on a web browser and related customer context information. In an embodiment of the present invention, the customer may be a potential customer of the contact center 100. The customer may be an existing customer of the contact center 100, in another embodiment of the present invention. The web browser may be a Web Real Time Communication (Web RTC) enabled browser, in an embodiment of the present invention. The Web RTC is a technology that enables media sessions between web browsers through data channels (e.g., voice, video, data flow, etc.).

In another embodiment of the present invention, other techniques having a functionality of Web RTC may also be used by using plug-ins installed at web browsers of the customer and the agents of the contact center. The browsing activities (and context information therefrom) of the customer may include, but is not limited to, a browsing duration, session information, shopping cart content, cookie information, an Internet Protocol (IP) address, a browsing history for a product and/or service, a customer's location, and so forth. In an embodiment of the present invention, the browsing activities may be monitored by using a customer's side snap-in. For example, a customer is browsing on an enterprise's website from the past 25 minutes and is looking for a product range, such as a television. That information is monitored by the monitoring module 232. In an embodiment of the present invention, the monitoring of the web browsing activities of the customer is carried out in a real-time environment.

Further, the monitoring module 232 may receive the browsing activities, and start gathering customer context information, when the customer initiates a Web RTC session with the contact center 100. For example, when a customer clicks on a contact button on a website associated with the contact center 100, browsing activities (and associated context information) associated with the customer is received by the monitoring module 232. In another embodiment of the present invention, the monitoring module 232 may receive the browsing activities (and context information) of a customer in parallel with a media session of the customer with an agent of the contact center 100. For example, if a customer is using a Web RTC audio channel to connect to an agent of the contact center 100, then this secured channel may be used to gain browsing activities of the customer. In an embodiment of the present invention, the browsing activities (and context information) of the customer may be received by a third party. In an exemplary embodiment of the present invention, the third party may be a Demilitarized Zone (DMZ).

The monitoring module 232 may further store the browsing activities (including context information) as browsing data in the database 114 of the contact center 100. In an embodiment of the present invention, the browsing data may be stored in a Context Store (CS) of the contact center 100. The browsing data of each customer may be stored as an entry in a Context Store (CS) snap-in with a unique ID for each session of the customer. The session may be a web browsing session of a customer on a website of an enterprise, in an embodiment of the present invention.

The script generation module 236 may analyze the browsing data stored in the database 114 of the contact center 100. In an embodiment of the present invention, the browsing data of the customer is analyzed and relevant words or phrases are selected as keywords. For example, browsing data of a customer indicates the customer was browsing for a television for the past 25 minutes, then "television" and browsing duration, i.e., "25 minutes", of the customer are selected as keywords. In an embodiment of the present invention, a contact center desktop service snap-in, installed at an agent's desktop or a work station, may analyze the browsing data for a customer communication session.

Further, the script generation module 236 may format the keywords of the browsing data, in an embodiment of the present invention. The formatting of words and/or phrases may include, but is not limited to, a highlight, an underline, a bold, and so forth. For example, from the keywords "television" and "25 minutes" (browsing duration of a customer), it is determined the customer is interested in buying the television, therefore, the keywords are formatted so an agent may emphasize on the formatted words in a future communication with the customer.

In an exemplary embodiment of the present invention, a phrase "you really, really need to buy this television" is selected, from the database 114, based on the browsing data of the customer. In an embodiment of the present invention, a contact center desktop service snap-in may analyze the browsing data for a customer communication session. The script generation module 236 may utilize the formatted browsing data of a customer for near future communication session with the customer. In an embodiment of the present invention, the future communication may include a communication session that may initiate within, but is not limited to, 1 minute, 2 minutes, 3 minutes, etc.

Further, the script generation module 236 may dynamically generate an agent's script based on the context information from the browsing activities of the customer. The script may include all the appropriate instructions that may be necessary for an agent of a contact center to improve handling of an incoming contact and to take the contact towards a successful conclusion. The instructions may include, but is not limited to, suggested modifications for an agent to handle an incoming contact. In an embodiment of the present invention, the script generation module 236 may generate a new agent's script based on the browsing data of the customer. For example, if a new customer is browsing for an air conditioner on a website of an enterprise, then, based on his browsing data, a new agent script is generated to provide services to the customer, which may result in a sale of the product.

The script generation module 236 may select a predefined agent script and then modify it by using the monitored browsing activities and customer context information therefrom, and/or data of the customer. The predefined agent script may be selected based on the monitored browsing activities of the customer, in an embodiment of the present invention. Further, the script generation module 236 may add selected phrases and/or words in the predefined agent script, in an embodiment of the present invention.

For example, if the customer is interested in buying a television and is constantly searching for it on an enterprise's website then a phrase "you really, really need to buy this television" is included in a predefined agent script. In an embodiment of the present invention, a contact center desktop service snap-in may analyze the browsing data and may notice and/or select relevant words, or phrases for a communication session with a customer.

In another embodiment of the present invention, the script generation module 236 may add instructions as how to communicate with a customer in a predefined agent script. For example, an instruction "speak with an excitable tone" is added for a certain phrase in a predefined agent script. The script generation module 236 may customize a predefined agent script based on a contractual situation, in yet another embodiment of the present invention. For example, a predefined script is selected and the formatted browsing data is used to tailor the predefined agent script. In an embodiment of the present invention, a speech service snap-in may be used to check for relevant phrases and/or words that are specifically required for a customer communication session and may import these phrases and/or words from the context store.

Further, the script generation module 236 may store the generated and/or modified script in the database 114 of the contact center 100.

The display module 240 may display the agent script to an agent of the contact center 100. In an embodiment of the present invention, the agent script may be displayed to an agent of the contact center 100 when the customer initiates a communication session with the agent. For example, browsing data is harvested from browsing activities of the customer and an agent script is generated, which is then displayed to an agent when the customer clicks on a "contact me" button on the web browser. Further, the display module 240 may display the agent's script on a desktop or a workstation of the agent handling the communication session with the customer, in an embodiment of the present invention. The agent script may be provided to the agent on a telephone call, through an email, a text message, a screen pop-up, and the like, in another embodiment of the present invention.

The verification module 244 may validate the agent's script that verifies if the agent is following the provided script while providing services to the customer. In an embodiment of the present invention, a voice recognition system (not shown) may be used to analyze and co-relate speech of the agent with the agent's script. A speech analyzer (not shown) may be used to analyze and co-relate speech of the agent with the agent's script, in another embodiment of the present invention. The speech of the agent is analyzed and co-related with the generated and/or modified agent script to determine whether the relevant words and/or phrases are being utilized by the agent.

For example, when the agent is communicating with the customer then the customer's speech is analyzed to check whether the phrase "you really, really need to buy this television" is being used by the agent. In an exemplary embodiment of the present invention, a tone of the agent may be analyzed that whether the agent has delivered the script with an excitable tone or not. In an embodiment of the present invention, the speech service snap-in may be used to verify the generated or modified agent script is adhered to during the conversation between the agent and the customer.

Further, the display module 240 may generate an alert for the agent when the generated or modified agent script is not followed by the agent. In an embodiment of the present invention, a supervisor of the contact center 100 may prompt a whisper to the agent to remind him to say certain relevant words and/or phrases of the script. A whisper may be considered as a prompt that may only be audible to an agent of the contact center 100 when the agent is on a call with a customer. In another embodiment of the present invention, the alerts may be provided to the agent's desktop. Further, the display module 240 may generate alerts and display notifications to a supervisor of the contact center 100 if the agent is not following the agent script, in yet another embodiment of the present invention. The display module 240 may generate a plurality of alerts comprising a beep, a flash, a popup, and so forth.

Figure 3:
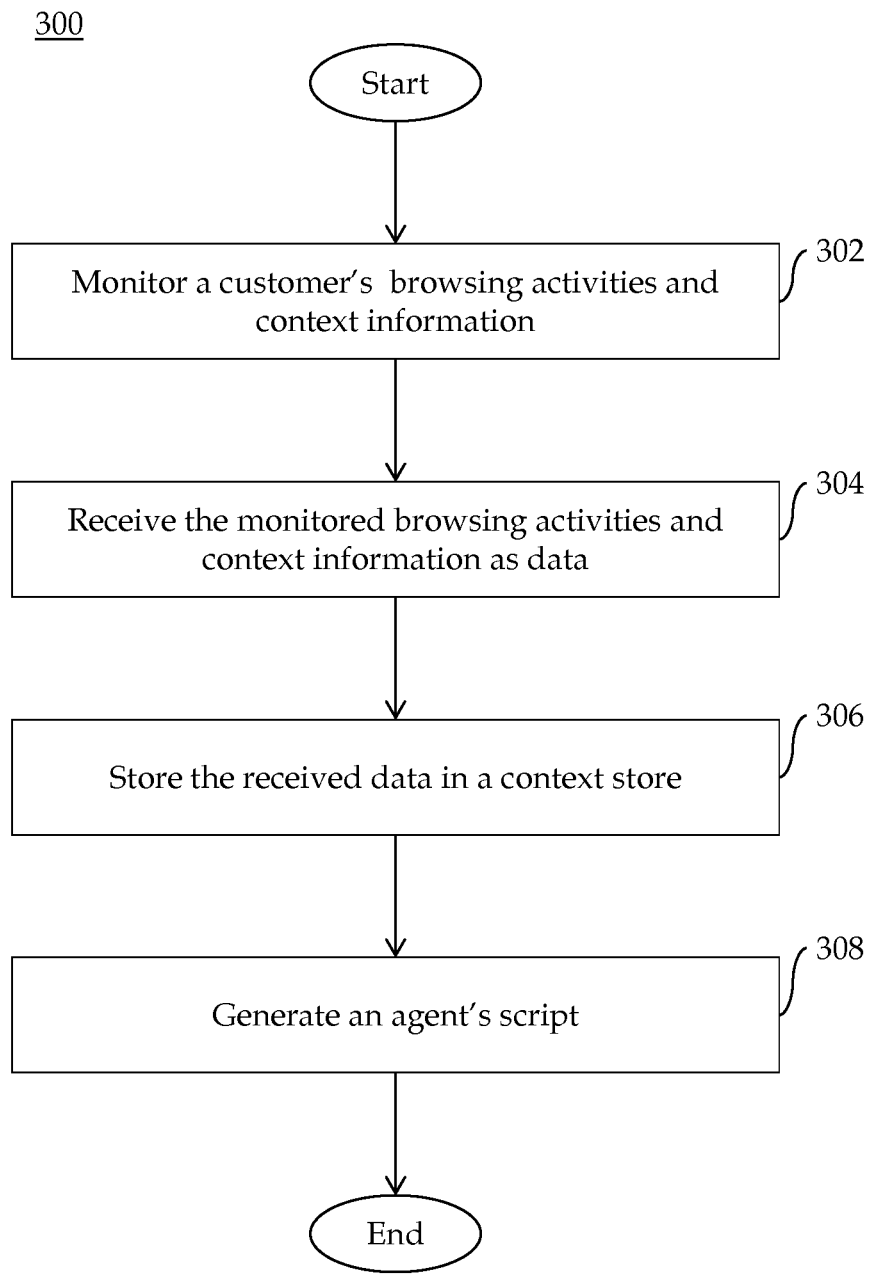
FIG. 3 depicts a flowchart of a method for generating an agent's script, according to an embodiment of the present invention.

FIG. 3 depicts a flowchart of a method for generating an agent's script, according to an embodiment of the present invention.

At step 302, a contact manager system 228 monitors a customer's browsing activities and related customer context information on a web browser. The web browser may be a Web RTC enabled web browser, in an embodiment of the present invention. The browsing activities of the customer, including context information, may include, but is not limited to, a browsing duration, session information, shopping cart content, cookie information, an Internet Protocol (IP) address, a browsing history for a product and/or service, a customer's location, and so forth. In an embodiment of the present invention, the browsing activities may be monitored by using a customer's side snap-in installed in the communication device of the customer. In an embodiment of the present invention, the monitoring of the web browsing activities and context information of the customer is carried out in a real-time environment.

At step 304, the contact manager system 228 receives the monitored customer's activities and context information. The monitored browsing activities (and related context information) of the customer may be received as browsing data. In an embodiment of the present invention, the contact manager computer system 228 receives the browsing data when the customer initiates a Web RTC session with an agent of the contact center 100. For example, when a customer clicks on a contact button on a website, browsing data associated with the customer is received. In another embodiment of the present invention, the contact manager computer system 228 receives the browsing data of the customer in parallel with a media session of the customer with an agent of the contact center 100. The browsing data of the customer may be received by a third party. In an exemplary embodiment of the present invention, the third party may be a Demilitarized Zone (DMZ) of the contact center 100.

Next, at step 306, the contact manager computer system 228 stores the browsing data in a Context Store (CS) of the contact center 100. The browsing data of each customer may be stored as an entry in a Context Store (CS) snap-in with a unique ID for each session of the customer. The session may be a web browsing session of a customer on a website of an enterprise, in an embodiment of the present invention.

At step 308, the contact manager system 228 generates an agent's script based on the browsing data of the customer. In an embodiment of the present invention, the contact manager computer system 228 generates a new agent's script based on the browsing data of the customer. For example, if a new customer is browsing for an air conditioner on a website of an enterprise, then based on stored browsing data a new agent script is generated to provide services to the customer, which may result in a sale of the product.

The contact manager computer system 228 selects a predefined agent script and then modifies it by using the stored browsing data of the customer. In an embodiment of the present invention, the contact manager computer system 228 may add relevant phrases and/or words in a predefined agent script. For example, if the customer is interested in buying a television and is frequently searching for it on an enterprise's website then a phrase "you really, really need to buy this television" relevant for the communication session is added in the predefined agent script.

In an embodiment of the present invention, a contact center desktop service snap-in may analyze the browsing data and may notice and/or select relevant words, or phrases for a customer communication session. Further, a speech service snap-in may be used to check for relevant phrases and/or words that are specifically required for a customer communication session and may import these phrases and/or words from the context store, in an embodiment of the present invention.

Figure 4A:
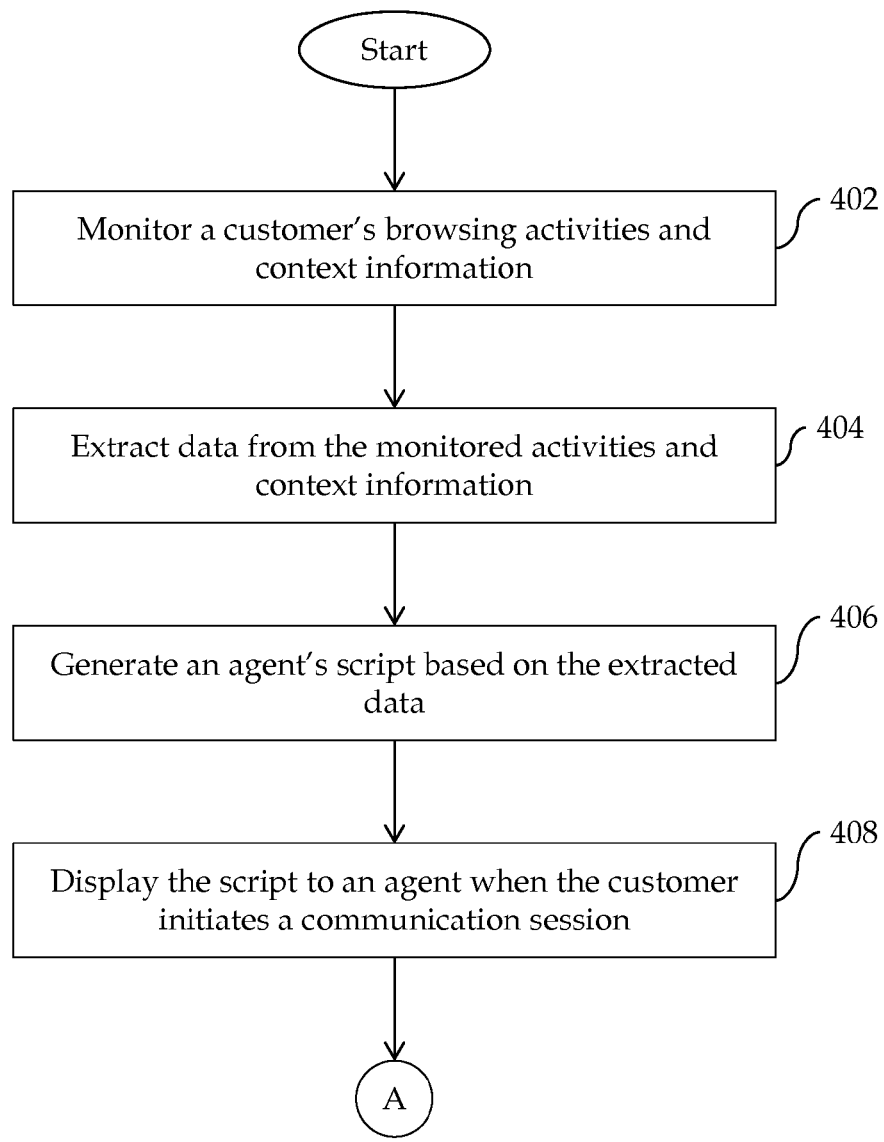
FIGS. 4A and 4B depict a flowchart of a method for guiding an agent during a communication session, according to an embodiment of the present invention.
Figure 4B:
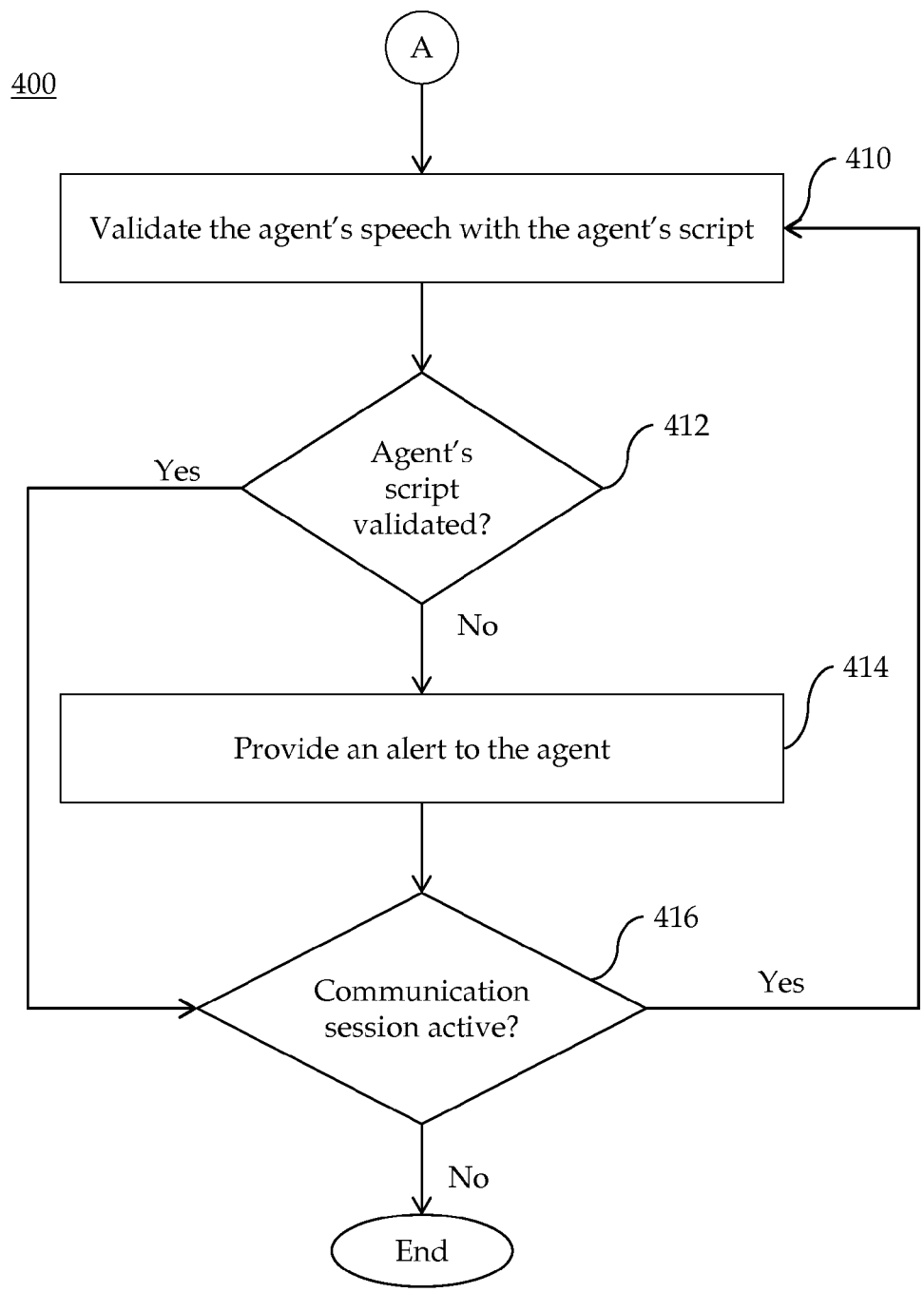

FIGS. 4A and 4B depict a flowchart of a method 400 for guiding agents during a communication session, according to another embodiment of the present invention.

At step 402, a contact manager system 228 monitors a customer's browsing activities and context information therefrom on a web browser. The web browser may be a Web RTC enabled web browser, in an embodiment of the present invention. The browsing activities (and thus context information) of the customer may include, but is not limited to, duration of browsing, session information, shopping cart content, cookie information, an Internet Protocol (IP) address, browsing history for a product and/or service, a customer's location, and so forth. In an embodiment of the present invention, the browsing activities and context information may be monitored by using a customer's side snap-in. In an embodiment of the present invention, the monitoring of the web browsing activities and context information of the customer is carried out in a real-time environment.

At step 404, the contact manager computer system 228 extracts browsing data from the monitored browsing activities of the customer. In an embodiment of the present invention, the browsing activities and context information of the customer are analyzed and relevant words or phrases are extracted as browsing data. For example, browsing activities of a customer indicate the customer is browsing for a television from past 25 minutes then "television" and browsing duration, i.e., "25 minutes", are extracted as relevant browsing data. In an embodiment of the present invention, a contact center desktop service snap-in may analyze the browsing activities for a customer communication session.

Next, at step 406, the contact manager computer system 228 generates an agent's script based on the extracted browsing data. In an embodiment of the present invention, the contact manager computer system 228 generates a new agent's script based on the browsing data of the customer. For example, if a new customer is browsing for a cell phone on a website of an enterprise, then based on stored browsing data a new agent script is dynamically generated to provide services to the customer, which may result in a sale of the product.

In another embodiment of the present invention, the contact manager computer system 228 selects a predefined agent script and then modifies it by using the stored browsing data of the customer. In an embodiment of the present invention, the contact manager computer system 228 may add relevant phrases and/or words in the predefined agent script. For example, if the customer is interested in buying a television and is frequently searches for it on an enterprise's website then a phrase "you really, really need to buy this television" relevant for the communication session is added in the predefined agent script. In an embodiment of the present invention, a contact center desktop service snap-in may analyze the browsing data and may notice and/or select relevant words, or phrases for a customer communication session. Further, a speech service snap-in may be used to check for relevant phrases and/or words that are specifically required for a customer communication session and may import these phrases and/or words from the context store, in an embodiment of the present invention.

At step 408, the contact manager computer system 228 displays the agent's script to an agent of the contact center 100. In an embodiment of the present invention, the agent script may be displayed to an agent of the contact center 100 when the customer initiates a communication session with the agent. For example, browsing data is harvested from the browsing activities of the customer and an agent script is generated, which is then displayed to an agent when the customer clicks on a "contact me" button on the web browser. Further, the contact manager system 228 may display the agent script on a desktop or a workstation of the agent handling the communication session with the customer, in an embodiment of the present invention. The agent script may be provided to the agent on a telephone call, through an email, a text message, a screen pop-up, and the like, in another embodiment of the present invention.

Thereafter, at step 410, the contact manager computer system 228 validates the agent's speech with the script displayed to the agent of the contact center 100. In an embodiment of the present invention, a voice recognition system may be used to analyze and co-relate the speech of the agent with the agent's script. A speech analyzer may be used to analyze and co-relate the speech of the agent with the agent's script, in another embodiment of the present invention.

At step 412, the contact manager computer system 228 determines whether the agent script is validated. The contact manager computer system 228 may validate that the agent is following the displayed script while providing services to the customer. If it is determined that the agent script is validated then the method 400 proceeds towards step 416. Otherwise, the method 400 proceeds towards step 414.

Further, at step 414, the contact manager computer system 228 provides an alert to the agent handling the customer's communication session when the agent is not following the displayed agent script. In an embodiment of the present invention, a supervisor of the contact center 100 may prompt a whisper to the agent to remind him to say certain relevant words and/or phrases of the script. In another embodiment of the present invention, the alerts may be provided to the agent on the desktop. Further, the contact manager computer system 228 may generate an alert and display a notification to a supervisor of the contact center 100 if the agent is not following the agent script, in yet another embodiment of the present invention. The contact manager computer system 228 may generate a plurality of alerts comprising a beep, a flash, a popup, and so forth.

At step 416, the contact manager computer system 228 determines whether the communication session between the customer and the agent is active. If it is determined the communication session is active, then the method 400 returns to the step 410 and continues validating the agent's speech with the agent's script. Otherwise, the method 400 concludes.

Figure 5:
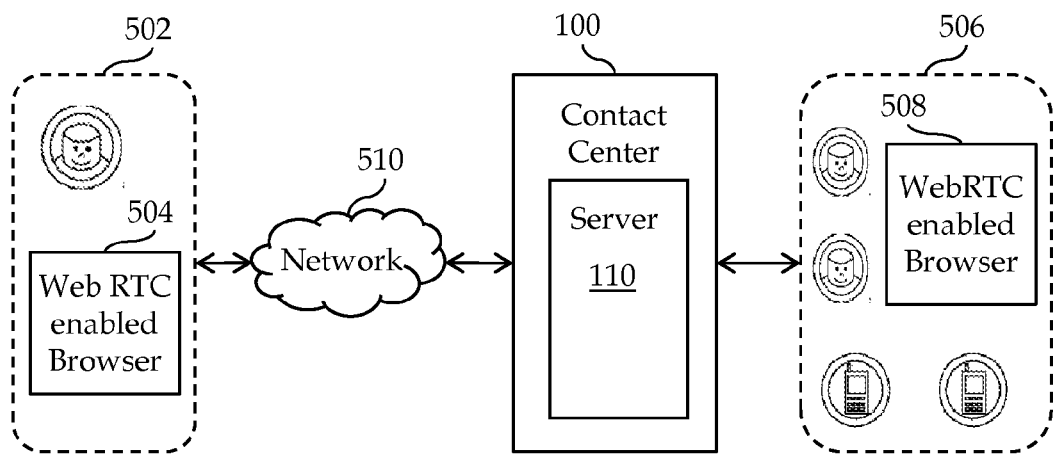
FIG. 5 illustrates an exemplary architecture in which various embodiments may be implemented, according to an embodiment of the present invention.

FIG. 5 illustrates an exemplary architecture in which various embodiments may be implemented, according to an embodiment of the present invention. A customer at a user terminal 502 may use a Web RTC enabled browser 504 for browsing products and/or services provided by an enterprise, and to communicate with an agent of the contact center 100 at an agent terminal 506. The agent at the agent terminal 506 may also use a Web RTC enabled browser 508 for communicating with the customer. The agent terminal 506 may be configured to provide customer support services to the customer at the user terminal 502.

The contact center 100 may be configured to support communication modes by using a wide variety of devices for the user terminals 502, including devices operating over analog or digital communication channels designed for the delivery of information to the customer in an audio form, a visual form (including static and dynamic visual elements), or any combination thereof. For example, in some embodiments of the present invention, the contact center 100 may be configured to support the user terminal 502 consisting of a general purpose computer device connected to a data network 510.

In particular, the contact center 100 connects and manages the communication session between the user terminal 502 and the agent terminal 506. Although the agent terminal 506 is connected to the network 510 via the contact center 100, the various embodiments are not limited in this regard. Rather, in some embodiments, one or more of the agent terminals 506 may be directly connected to the network 510 and may communicate with the contact center 100 via the network 510. The agent terminal 506, like the user terminal 502 may be configured to support real-time and/or time-shifted communication modes. Accordingly, the description above regarding the communication modes and devices for the user terminal 502 is equally applicable to the agent terminal 506.

The server 110 of the contact center 100 includes the contact manager computer system 228. The Web RTC enabled browsers 504 and 508 are configured to make point to point contacts between the agent and the customer. The contact manager computer system 228 is configured to harvest browsing activities and related context information of the customer from the Web RTC enabled browser 504. The browsing activities (and context information) of the customer are then selected and formatted to extract relevant phrases and/or words. The extracted phrases and/or words are then be used to generate an agent's script. Further, when the customer initiates a communication session with an agent at the agent terminal 506, the agent script is provided to an agent for handling the communication session. Further, the agent script is validated and an alert is generated if the agent is not following the displayed script.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A server for dynamically generating at least one agent script, the server comprising a processor and a memory storing software instructions, the processor coupled to the memory executes the software instructions to: determine one or more browsing activities of at least one customer and obtain customer context information of the at least one customer from the one or more determined browsing activities, wherein the one or more determined browsing activities occurs when the at least one customer is connected with one or more agents; generate the at least one agent script based on the obtained customer context information from the one or more determined browsing activities of the at least one customer; and provide the at least one agent script for display to the one or more agents.

2. The server of claim 1, wherein the one or more determined browsing activities are determined from a Web Real Time Communication (Web RTC) enabled browser.

3. The server of claim 1, wherein the processor further executes the software instructions to receive the one or more determined browsing activities of the at least one customer through one or more Web RTC data channels.

4. The server of claim 1, wherein the processor further executes the software instructions to generate the at least one agent script by dynamically modifying at least one predefined agent script based on the obtained customer context information of the one or more determined browsing activities.

5. The server of claim 4, wherein the processor further executes the software instructions to store the at least one predefined agent script in a database.

6. The server of claim 5, wherein the processor further executes the software instructions to provide the at least one predefined agent script for display to at least one agent when the at least one customer initiates at least one communication session.

7. The server of claim 6, wherein the at least one predefined agent script comprises one or more instructions to handle the at least one communication session.

8. The server of claim 1, wherein the processor further executes the software instructions to validate the at least one agent script.

9. The server of claim 1, wherein the processor further executes the software instructions to correlate the speech of one of the one or more agents with the at least one agent script.

10. The server of claim 1, wherein the processor further executes the software instructions to display an alert for non-compliance of the at least one agent script by one of the one or more agents.

11. A computer-implemented method for dynamically generating at least one agent script, the method comprising: determining by a processor one or more browsing activities of at least one customer to obtain customer context information of the at least one customer, wherein the one or more determined browsing activities occurs when the at least one customer is connected with one or more agents; generating by the processor the at least one agent script based on the obtained customer context information from the one or more determined browsing activities; and providing by the processor the at least one agent script for display to the one or more agents.

12. The method of claim 11, wherein the one or more determined browsing activities are determined from a Web Real Time Communication (Web RTC) enabled browser.

13. The method of claim 11, further comprising generating the at least one agent script by dynamically modifying at least one predefined agent script based on the obtained customer context information of the one or more browsing activities.

14. The method of claim 13, further comprising storing by the processor the at least one predefined agent script in a database.

15. The method of claim 14, wherein the at least one predefined agent script is displayed to the one or more agents when the at least one customer initiates at least one communication session.

16. The method of claim 11, further comprising validating the at least one agent script.

17. The method of claim 16, further comprising correlating the speech of one of the one or more agents with the at least one agent script for validating the at least one agent script.

18. The method of claim 11, further comprising generating at least one alert for at least one non-compliant agent script.

19. A computer-implemented method for guiding one or more agents during a communication session, the method comprising: determining by a processor one or more browsing activities of at least one customer and obtaining customer context information of the at least one customer from the one or more determined browser activities; selecting by the processor at least one browsing activity from the one or more determined browsing activities of the at least one customer, wherein the at least one selected browsing activity occurs when the at least one customer is connected to one or more agents; generating by the processor at least one agent script based on the customer context information of the at least one selected browsing activity; and providing by the processor the at least one agent script for display to the one or more agents.

20. The method of claim 19, further comprising validating the at least one generated agent script by correlating the speech of one of the one or more agents with the at least one agent script for validating the at least one agent script.

* * * * *